US010829163B2

(12) United States Patent
McCloud et al.

(10) Patent No.: US 10,829,163 B2
(45) Date of Patent: Nov. 10, 2020

(54) TRANSVERSE BEAM FOR COMPOSITE FLOOR STRUCTURE AND METHOD OF MAKING THE SAME

(71) Applicant: Wabash National, L.P., Lafayette, IN (US)

(72) Inventors: Travis S. McCloud, Cadiz, KY (US); Scott A. Storz, Lafayette, IN (US); Andrzej Wylezinski, Lafayette, IN (US); Ronnal P. Reichard, Melbourne, FL (US); Scott M. Lewit, Indialantic, FL (US)

(73) Assignee: Wabash National, L.P., Lafayette, IN (US)

( * ) Notice: Subject to any disclaimer, the term of this patent is extended or adjusted under 35 U.S.C. 154(b) by 91 days.

(21) Appl. No.: 16/100,276

(22) Filed: Aug. 10, 2018

(65) Prior Publication Data
US 2019/0047634 A1    Feb. 14, 2019

Related U.S. Application Data

(60) Provisional application No. 62/543,467, filed on Aug. 10, 2017.

(51) Int. Cl.
*B62D 25/20* (2006.01)
*B32B 5/18* (2006.01)
(Continued)

(52) U.S. Cl.
CPC ............ *B62D 25/2054* (2013.01); *B32B 5/12* (2013.01); *B32B 5/18* (2013.01); *B32B 7/08* (2013.01);
(Continued)

(58) Field of Classification Search
CPC ......... B62D 25/2054; B32B 5/18; B32B 7/12; B32B 7/08; B32B 5/12; B32B 27/08;
(Continued)

(56) References Cited

U.S. PATENT DOCUMENTS

| 3,557,992 A | 1/1971 | Reeves |
| 3,637,252 A | 1/1972 | Vletsker |

(Continued)

FOREIGN PATENT DOCUMENTS

| AU | 713260 | 11/1999 |
| CA | 1329818 | 5/1994 |

(Continued)

OTHER PUBLICATIONS

Black Sara "Structural adhesives Part I: Industrial" CompositesWorld posted Apr. 11, 2016 7 pages.

(Continued)

*Primary Examiner* — D Glenn Dayoan
*Assistant Examiner* — Melissa Ann Bonifazi
(74) *Attorney, Agent, or Firm* — Faegre Drinker Biddle & Reath LLP

(57) ABSTRACT

A composite floor structure having a plurality of transverse beams. Each transverse beam may include a preform core having a plurality of side surfaces and two end surfaces, and at least one reinforcing layer formed around each of the side surfaces of the preform core.

23 Claims, 14 Drawing Sheets

(51) Int. Cl.
  *B32B 7/12* (2006.01)
  *B32B 7/08* (2019.01)
  *B32B 5/12* (2006.01)
  *B32B 27/06* (2006.01)
  *B32B 27/08* (2006.01)
  *B32B 27/12* (2006.01)
  *B32B 27/40* (2006.01)

(52) U.S. Cl.
  CPC .............. *B32B 7/12* (2013.01); *B32B 27/065* (2013.01); *B32B 27/08* (2013.01); *B32B 27/12* (2013.01); *B32B 27/40* (2013.01); *B32B 2262/101* (2013.01); *B32B 2266/0278* (2013.01); *B32B 2605/08* (2013.01)

(58) Field of Classification Search
  CPC ....... B32B 27/12; B32B 27/40; B32B 27/065; B32B 2305/08; B32B 2262/101; B32B 2266/0278
  See application file for complete search history.

(56) References Cited

U.S. PATENT DOCUMENTS

| | | |
|---|---|---|
| 4,418,507 A | 12/1983 | Roberts et al. |
| 4,685,720 A | 8/1987 | Oren |
| 4,758,299 A | 7/1988 | Burke |
| 4,976,490 A | 12/1990 | Gentle |
| 5,403,063 A | 4/1995 | Sjostedt et al. |
| 5,429,066 A | 7/1995 | Lewit et al. |
| 5,507,405 A | 4/1996 | Thomas |
| 5,562,981 A | 10/1996 | Ehrlich |
| 5,664,518 A | 9/1997 | Lewit et al. |
| 5,700,118 A | 12/1997 | Bennett |
| 5,765,639 A | 6/1998 | Muth |
| 5,772,276 A | 6/1998 | Fetz et al. |
| 5,800,749 A | 9/1998 | Lewit et al. |
| 5,802,984 A | 9/1998 | Thoman |
| 5,830,308 A | 11/1998 | Reichard |
| 5,860,668 A | 1/1999 | Hull et al. |
| 5,860,693 A | 1/1999 | Ehrlich |
| 5,890,435 A | 4/1999 | Thoman |
| 5,897,818 A | 4/1999 | Lewit et al. |
| 5,908,591 A | 6/1999 | Lewit et al. |
| 5,916,093 A | 6/1999 | Fecko |
| 5,979,684 A | 11/1999 | Ohnishi |
| 5,992,117 A | 11/1999 | Schmidt |
| 6,004,492 A | 12/1999 | Lewit et al. |
| 6,013,213 A | 1/2000 | Lewit et al. |
| 6,076,693 A | 6/2000 | Reiter |
| 6,082,810 A | 7/2000 | Bennett |
| 6,092,472 A | 7/2000 | Thoman |
| 6,199,939 B1 | 3/2001 | Ehrlich |
| 6,206,669 B1 | 3/2001 | Lewit et al. |
| 6,220,651 B1 | 4/2001 | Ehrlich |
| 6,227,125 B1 | 5/2001 | Schroeder |
| 6,247,747 B1 | 6/2001 | Kawanomoto |
| 6,318,794 B1 | 11/2001 | Berube |
| 6,349,988 B1 | 2/2002 | Foster |
| 6,374,546 B1 | 4/2002 | Fecko |
| 6,496,190 B1 | 12/2002 | Driemeyher et al. |
| 6,497,190 B1 | 12/2002 | Lewit |
| 6,505,883 B1 | 1/2003 | Ehrlich |
| 6,543,469 B2 | 4/2003 | Lewit et al. |
| 6,615,741 B2 | 9/2003 | Fecko |
| 6,626,622 B2 | 9/2003 | Zubko |
| 6,688,835 B1 | 2/2004 | Buher |
| 6,723,273 B2 | 4/2004 | Johnson et al. |
| 6,740,381 B2 | 5/2004 | Day et al. |
| 6,745,470 B2 | 6/2004 | Foster et al. |
| 6,755,998 B1 | 6/2004 | Reichard et al. |
| 6,761,840 B2 | 7/2004 | Fecko |
| 6,824,341 B2 | 11/2004 | Ehrlich |
| 6,843,525 B2 | 1/2005 | Preisler |
| 6,854,791 B1 | 2/2005 | Jaggi |
| 6,863,339 B2 | 3/2005 | Bohm |
| 6,869,561 B2 | 3/2005 | Johnson et al. |
| 6,877,940 B2 | 4/2005 | Nelson |
| 6,893,075 B2 | 5/2005 | Fenton et al. |
| 6,911,252 B2 | 6/2005 | Lewit et al. |
| 6,986,546 B2 | 1/2006 | Ehrlich |
| 7,000,978 B1 | 2/2006 | Messano |
| 7,025,166 B2 | 4/2006 | Thomas |
| 7,025,408 B2 | 4/2006 | Jones et al. |
| 7,069,702 B2 | 7/2006 | Ehrlich |
| 7,134,820 B2 | 11/2006 | Ehrlich |
| 7,182,396 B2 | 2/2007 | Taylor |
| 7,219,952 B2 | 5/2007 | Taylor |
| 7,264,305 B2 | 9/2007 | Kuriakose |
| 7,353,960 B2 | 4/2008 | Seiter |
| 7,407,216 B2 | 8/2008 | Taylor |
| 7,434,520 B2 | 10/2008 | Zupancich |
| 7,451,995 B2 | 11/2008 | Bloodworth et al. |
| 7,461,888 B2 | 12/2008 | Brown |
| 7,517,005 B2 | 4/2009 | Kuriakose |
| 7,575,264 B1 | 8/2009 | Solomon |
| 7,578,534 B2 | 8/2009 | Wuerfel, III |
| 7,578,541 B2 | 8/2009 | Layfield |
| 7,587,984 B2 | 9/2009 | Zupancich |
| 7,588,286 B2 | 9/2009 | Lewallen |
| 7,594,474 B2 | 9/2009 | Zupancich |
| 7,608,313 B2 * | 10/2009 | Solomon ............... E04B 1/6141 404/35 |
| 7,621,589 B1 | 11/2009 | Gerome |
| 7,704,026 B2 | 4/2010 | Roush |
| 7,722,112 B2 | 5/2010 | Ehrlich |
| 7,748,172 B2 | 7/2010 | Zupancich |
| 7,762,618 B2 | 7/2010 | Lewallen |
| 7,790,076 B2 | 9/2010 | Seiter |
| 7,829,165 B2 | 11/2010 | Grandominico et al. |
| 7,887,120 B2 | 2/2011 | Boivin |
| 7,901,537 B2 | 3/2011 | Jones |
| 7,905,072 B2 | 3/2011 | Verhaeghe |
| 7,914,034 B2 | 3/2011 | Roush |
| 7,931,328 B2 | 4/2011 | Lewallen |
| 8,016,322 B2 | 9/2011 | Keehan |
| 8,056,960 B2 | 11/2011 | Brown |
| 8,186,747 B2 | 5/2012 | Bloodworth et al. |
| 8,263,217 B2 | 9/2012 | Verhaeghe |
| 8,342,588 B2 | 1/2013 | Skaradzinski |
| 8,448,989 B2 | 5/2013 | Verhaeghe |
| 8,474,171 B1 | 7/2013 | Ludwick |
| 8,696,048 B2 | 4/2014 | Griffin et al. |
| 8,757,704 B2 | 6/2014 | Zhao et al. |
| 8,814,255 B2 | 8/2014 | Yamaji et al. |
| 8,876,193 B2 | 11/2014 | Kunkel et al. |
| 8,950,144 B2 | 2/2015 | Padmanabhan |
| 9,051,014 B2 | 6/2015 | Lookebill et al. |
| 9,138,943 B2 | 9/2015 | Weinberg |
| 9,138,974 B2 | 9/2015 | Weinberg |
| 9,138,975 B2 | 9/2015 | Weinberg |
| 9,174,656 B2 | 11/2015 | Heitmeyer |
| 9,199,440 B2 | 12/2015 | Weinberg |
| 9,205,635 B2 | 12/2015 | Weinberg |
| 9,260,117 B2 | 2/2016 | Vande Sands |
| 9,339,987 B2 | 5/2016 | Weinberg |
| 9,371,468 B2 | 6/2016 | Lewit |
| 9,409,607 B2 | 8/2016 | Osten |
| 9,434,421 B1 | 9/2016 | Lu |
| 9,499,203 B1 | 11/2016 | Finley |
| 9,566,769 B2 | 2/2017 | Weinberg |
| 9,604,677 B2 | 3/2017 | McKinney |
| 9,650,003 B2 | 5/2017 | Owens |
| 9,708,009 B2 | 7/2017 | Vance |
| 9,738,050 B2 | 8/2017 | Lee |
| 9,744,753 B2 | 8/2017 | Sheffield |
| 9,815,501 B2 | 11/2017 | McCormack |
| 9,827,750 B2 | 11/2017 | Lookebill |
| 9,828,164 B2 | 11/2017 | Denson |
| 9,878,744 B2 | 1/2018 | Lu |
| 9,884,660 B2 | 2/2018 | Fenton |
| 9,884,661 B2 | 2/2018 | Fenton |
| 9,889,637 B2 | 2/2018 | Weinberg |
| 2001/0011832 A1 | 8/2001 | Ehrlich |

(56) References Cited

U.S. PATENT DOCUMENTS

| | | |
|---|---|---|
| 2005/0194381 A1 | 9/2005 | Zupancich |
| 2005/0241253 A1 | 11/2005 | Song et al. |
| 2006/0065152 A1 | 3/2006 | Heitmeyer |
| 2006/0108361 A1 | 5/2006 | Seiter |
| 2006/0121244 A1 | 6/2006 | Godwin |
| 2006/0123725 A1 | 6/2006 | Godwin |
| 2006/0158005 A1 | 7/2006 | Brown |
| 2006/0179733 A1 | 8/2006 | Padmanabhan |
| 2006/0201081 A1 | 9/2006 | Godwin |
| 2006/0219129 A1 | 10/2006 | Jarvis |
| 2007/0119850 A1 | 5/2007 | Seiter |
| 2007/0132278 A1 | 6/2007 | Lester et al. |
| 2007/0160793 A1 | 7/2007 | Cageao |
| 2007/0194602 A1 | 8/2007 | Ehrlich |
| 2007/0216197 A1 | 9/2007 | Wuerfel, III |
| 2007/0250025 A1 | 10/2007 | Sams |
| 2008/0290057 A1 | 11/2008 | Zupancich |
| 2009/0126600 A1 | 5/2009 | Zupancich |
| 2009/0278386 A1 | 11/2009 | Ehrlich |
| 2010/0101876 A1 | 4/2010 | Misencik |
| 2010/0109309 A1 | 5/2010 | Kootstra |
| 2011/0095574 A1 | 4/2011 | Brown |
| 2011/0204611 A1 | 8/2011 | Ziegler |
| 2013/0207413 A1 | 8/2013 | Lookebill et al. |
| 2014/0199551 A1 | 7/2014 | Lewit |
| 2014/0262011 A1 | 9/2014 | Lewit et al. |
| 2014/0300134 A1 | 10/2014 | Gerst |
| 2015/0054311 A1 | 2/2015 | Marchesano et al. |
| 2015/0076861 A1 | 3/2015 | Padmanabhan |
| 2015/0137560 A1 | 5/2015 | Presiler |
| 2015/0158532 A1 | 6/2015 | Ayuzawa |
| 2015/0203160 A1 | 7/2015 | Peterson et al. |
| 2017/0057561 A1 | 3/2017 | Fenton |
| 2017/0166263 A1 | 6/2017 | McKinney |
| 2017/0210317 A1 | 7/2017 | Owens |
| 2017/0240216 A1 | 8/2017 | Bauer |
| 2017/0240217 A1 | 8/2017 | Storz |
| 2017/0241134 A1 | 8/2017 | McCloud |
| 2017/0247063 A1 | 8/2017 | Banerjee |
| 2017/0282499 A1 | 10/2017 | LaRocco |
| 2017/0334489 A1 | 11/2017 | Shin |
| 2018/0037151 A1 | 2/2018 | Bauer et al. |

FOREIGN PATENT DOCUMENTS

| | | |
|---|---|---|
| CA | 2181750 | 1/1997 |
| CA | 2199584 | 9/1997 |
| CA | 2253308 | 11/1997 |
| CA | 2551863 | 3/1998 |
| CA | 2219312 | 4/1998 |
| CA | 2242467 | 7/1999 |
| CA | 2261384 | 8/1999 |
| CA | 2265405 | 1/2000 |
| CA | 2275848 | 12/2000 |
| CA | 2382578 | 3/2001 |
| CA | 2455957 | 5/2004 |
| CA | 2768878 | 3/2005 |
| CA | 2811134 | 4/2006 |
| CA | 2529762 | 6/2006 |
| CA | 2650992 | 11/2006 |
| CA | 2528558 | 5/2007 |
| CA | 2565510 | 8/2007 |
| CA | 2604282 | 3/2008 |
| CA | 2689745 | 7/2009 |
| CA | 2689746 | 7/2009 |
| CA | 2689747 | 7/2009 |
| CA | 2689748 | 7/2009 |
| CA | 2689749 | 7/2009 |
| CA | 2689751 | 7/2009 |
| CA | 2797778 | 7/2009 |
| CA | 2802907 | 7/2009 |
| CA | 2788047 | 8/2011 |
| CA | 2763094 | 7/2012 |
| CA | 2848174 | 10/2014 |
| CA | 2894059 | 12/2015 |
| CA | 2807710 | 5/2016 |
| CA | 2977131 | 9/2016 |
| CA | 2958805 | 8/2017 |
| CA | 2958838 | 8/2017 |
| CA | 2958839 | 8/2017 |
| DE | 2617169 | 10/2013 |
| EP | 2660119 | 6/2013 |
| JP | 06293233 | 10/1994 |

OTHER PUBLICATIONS

CMS North America Inc. "Transportation: Refrigerated Semi-trailers Trailers & Vans" available online at http:www.cmsna.com13_transportation_refrigerated_semi_trailers_trailers_vans.php on or before Jul. 2, 2014 2 pages.

North American Composites Virtual Engineered Composites (VEC) Article available online at http:www.nacomposites.comdelivering-performancepage.asp?issueid=7&page=cover Fall 2006 4 pages.

Reichard Dr. Ronnal P. "Composites in Theme Parks: From the perspective of a contractor—trouble shooter—enthusiast!" presented at Florida Institute of Technology at least as early as 1999 37 pages.

Lightweight Structures B.V. "ColdFeather: lightweight composite isothermal trailer" available online at http:www.lightweight-structures.comcoldfeather-lightweight-composite-isothermal-trailerindex.html at least as early as Jun. 18, 2015 6 pages.

Expedition Portal "Truck Camper Construction Costs?" available online at http:www.expeditionportal.comforumthreads12486-Truck-Camper-Construction-Costs at least as early as Jun. 18, 2015 5 pages.

Griffiths Bob "Rudder Gets New Twist with Composites" CompositesWorld posted Aug. 1, 2006 4 pages.

Morey Bruce "Advanced Technologies Supplement: Processes Reduce Composite Costs" Advanced Manufacturing posted Apr. 1, 2007 7 pages.

NetCompositesNow.com "Twisted Composites Rudders" available online at http:www.netcomposites.comnewstwisted-composites-rudders3202 as early as Aug. 11, 2005 3 pages.

Eric Green Associates.com "Composite Rudders Take Shape for U.S. Navy" available online at http:www.ericgreeneassociates.comimagesComposite_Twisted_Rudder.pdf accessed as early as Jul. 13, 2014 7 pages.

Seaver Mark and Trickey Stephen "Underwater Blast Loading of a Composite Twisted Rudder with FBGS" dated Apr. 14, 2008 19th International Conference on Optical Fibre Sensors 2 pages.

Scott Bader Group Companies Crystic "Composites Handbook" 100 pages.

Kedward Keith and Whitney James Delaware Composites Design Encyclopedia "Design Studies" vol. 5 1990 preview version available at https:books.google.combooks?id=9-KYOm81MWEC&printsec=frontcover#v=onepage&q&f=false 17 pages.

Zweben Carl Handbook of Materials Selection "Chapter 12: Composite Materials" 2002 preview version available at https:books.google.combooks?id=gWg-rchM700C&printsec=frontcover#v=onepage&q&f=false 47 pages.

Johnson Truck Bodies Blizzard Series brochure accessed as early as Aug. 1, 2014 8 pages.

International Trucking Shows "True Composites Platform Highlight of International Trucking Show" Aug. 1992 1 page.

Composite Twisted Rudder TCC Meeting 2008 handout 32 pages.

Composite Marine Control Surface installed on USS Pioneer (MCM 9) May 1997 13 pages.

TrailerBody Builders "More Emphasis on Less Weight" available at http:trailer-bodybuilders.comtrailersmore-emphasis-less-weight May 1, 2008 5 pages.

* cited by examiner

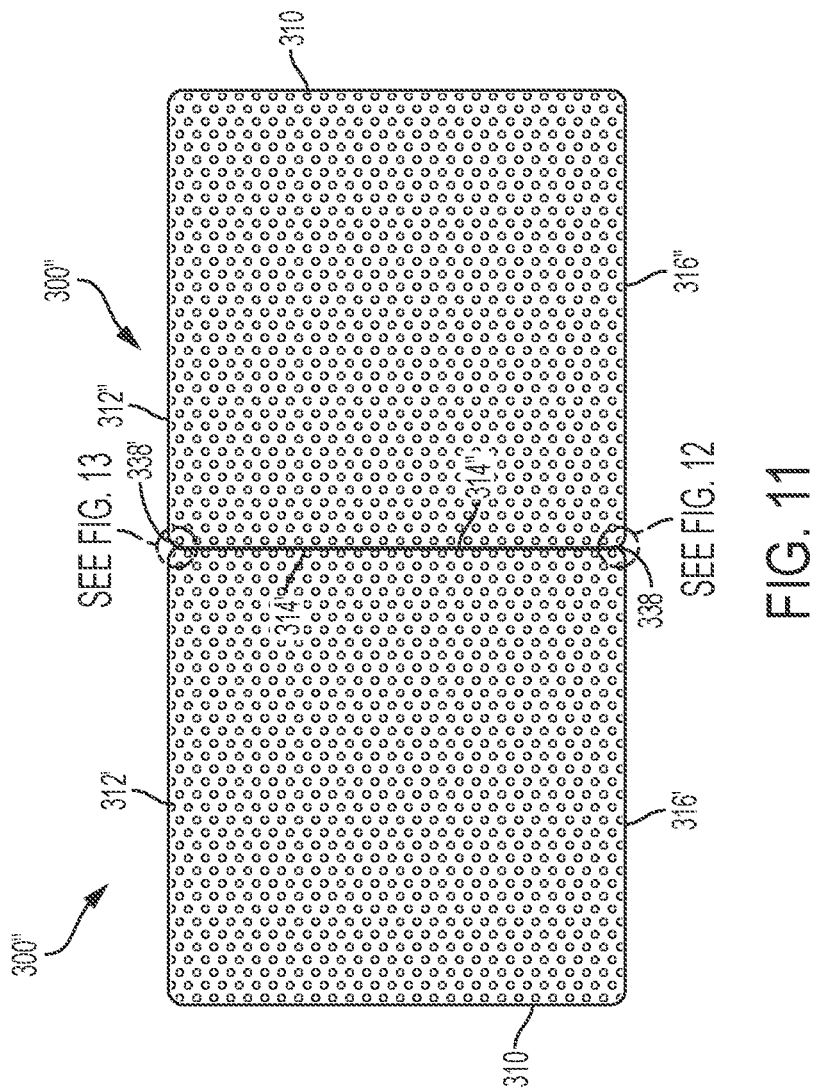

TRANSVERSE BEAM FOR COMPOSITE FLOOR STRUCTURE AND METHOD OF MAKING THE SAME

CROSS REFERENCE TO RELATED APPLICATION

This application claims priority to U.S. Provisional Patent Application Ser. No. 62/543,467, filed Aug. 10, 2017, the disclosure of which is hereby expressly incorporated by reference herein in its entirety.

FIELD OF THE DISCLOSURE

The present disclosure relates generally to floor structures and methods of making the same. More particularly, the present disclosure relates to transverse beams for floor structures made of composite materials for use in cargo vehicles and other applications and methods of making the same.

BACKGROUND OF THE DISCLOSURE

Cargo vehicles are used in the transportation industry for transporting many different types of cargo. Cargo vehicles may be constructed using composite materials, which may lead to an absence of or reduction in metallic and wood materials and associated advantages, including simplified construction, thermal efficiency, reduced water intrusion and corrosion, and improved fuel efficiency through weight reduction, for example. However, composite materials, in some locations and arrangements, may have reduced strength as compared to metallic and/or wood materials. Thus, strengthened floor structures are desired.

SUMMARY OF THE DISCLOSURE

A composite floor structure and method of making the same are disclosed. The composite floor structure may include a platform and a plurality of transverse beams. The composite floor structure may also include at least one longitudinal beam. The composite floor structure may also include an underlayment between the plurality of transverse beams and the at least one longitudinal beam. Some or all of these components may be integrally molded together to form a fiber-reinforced polymer structure. The composite floor structure may be used for cargo vehicles and other applications.

According to an exemplary embodiment of the present disclosure, a composite floor structure for use in a cargo vehicle having a front end, a rear end, and a longitudinal axis extending between the front and rear ends comprises a plurality of transverse beams. Each transverse beam is constructed of a composite material and has an upper wall, a first side wall, a second side wall, and a lower wall. The plurality of transverse beams are arranged perpendicular to the longitudinal axis and in direct contact with one another such that the first side wall of one transverse beam directly contacts the second side wall of an immediately adjacent transverse beam.

According to another exemplary embodiment of the present disclosure, a transverse beam comprises a preform core having a plurality of side surfaces, and a primary reinforcing layer formed around each of the side surfaces of the preform core. The primary reinforcing layer includes two tabs configured to fold onto one another and sized to cover at least one of the plurality of side surfaces of the preform core.

According to yet another exemplary embodiment of the present disclosure, a transverse beam comprises a preform core having a plurality of side surfaces, a primary reinforcing layer formed around at least three side surfaces of the preform core, and an additional reinforcing layer sized to cover at least one side of the preform core separate from the at least three side surfaces covered by the primary reinforcing layer. The primary reinforcing layer and the additional reinforcing layer each having a first edge and a second edge, the first edge of the primary reinforcing layer being adjacent the first edge of the additional reinforcing layer and the second edge of the primary reinforcing layer being adjacent the second edge of the additional reinforcing layer.

According to still yet another exemplary embodiment of the present disclosure, a transverse beam comprises a preform core having a plurality of side surfaces, and a primary reinforcing layer formed around each of the side surfaces of the preform, where the primary reinforcing layer has a first edge and a second edge, the first and second edges being coupled together.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 11 shows an end view of multiple transverse beams of FIG. 9 positioned next to each other;

Figure 1:
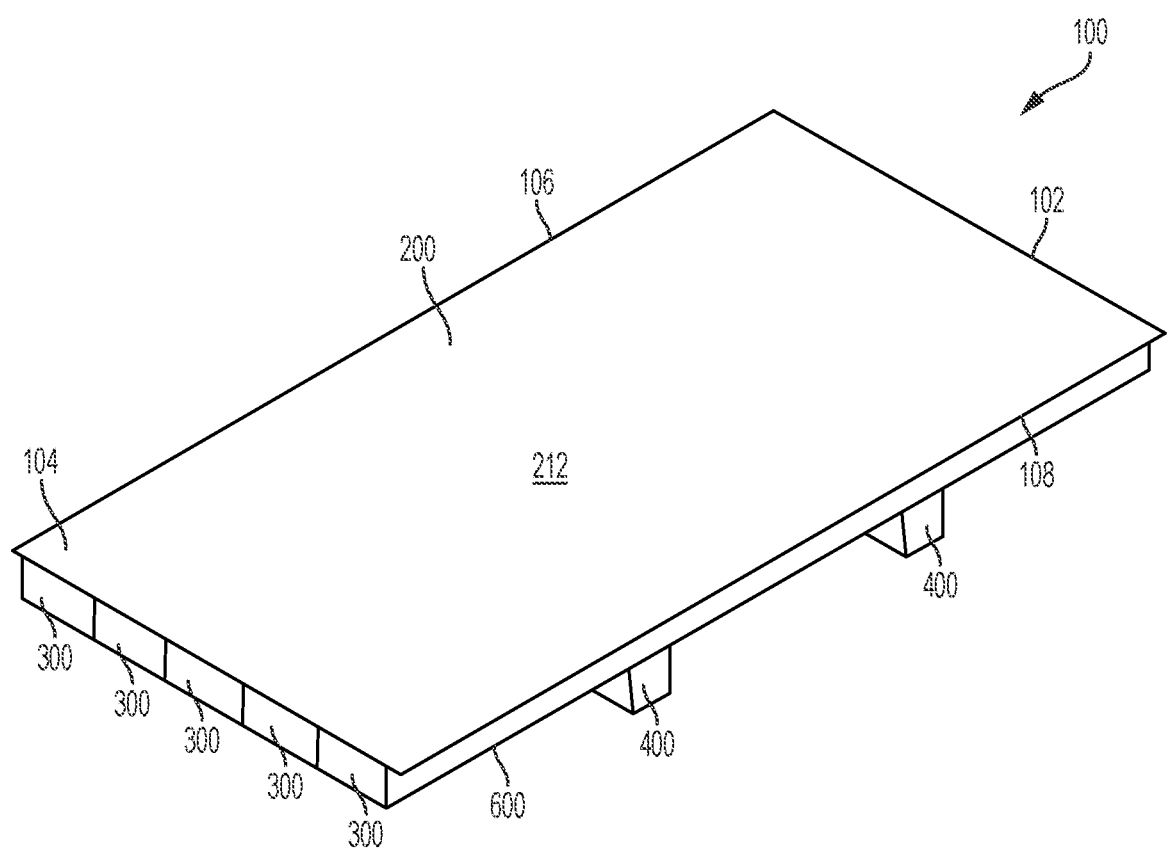
FIG. 1 shows a top perspective view of an exemplary composite floor structure of the present disclosure, the composite floor structure including a platform, a plurality of transverse beams, a plurality of longitudinal beams, and an underlayment.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

1. Floor Structure

Referring initially to FIGS. 1-5, a composite floor structure 100 is shown. In certain embodiments, the composite floor structure 100 may be used in cargo vehicles for supporting and transporting cargo, including semi trailers (e.g., refrigerated semi trailers, dry freight semi trailers, flatbed semi trailers), other trailers, box trucks or vans, and the like. In other embodiments, the composite floor structure 100 may be used to construct dump trucks or dump trailers, boat docks, mezzanines, storage units, or temporary shelters, for example. Accordingly, those skilled in the art will appreciate that the present invention may be implemented in a number of different applications and embodiments and is not specifically limited in its application to the particular embodiments depicted herein.

Figure 2:
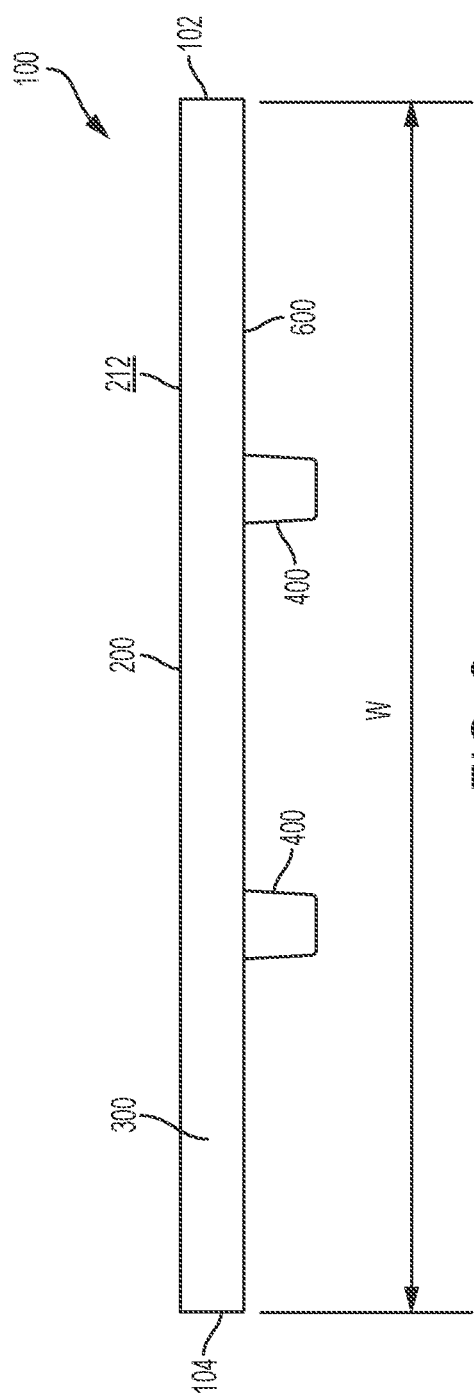
FIG. 2 shows a rear end elevational view of the composite floor structure of FIG. 1.
Figure 3:
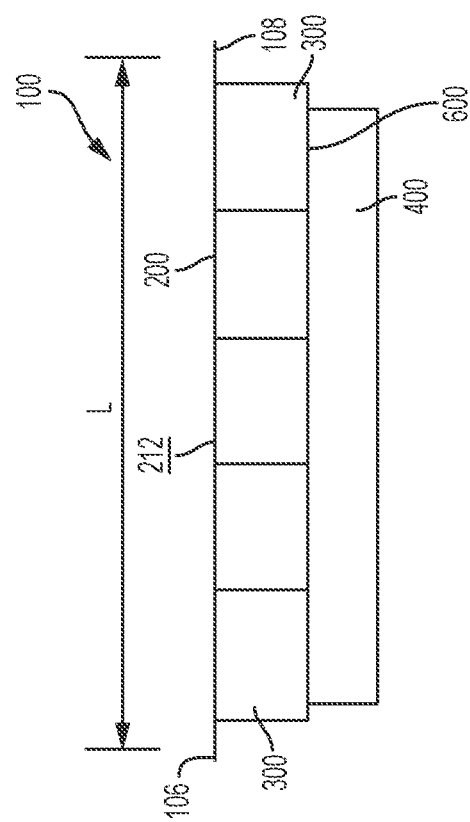
FIG. 3 shows a left side elevational view of the composite floor structure of FIG. 1.
Figure 4:
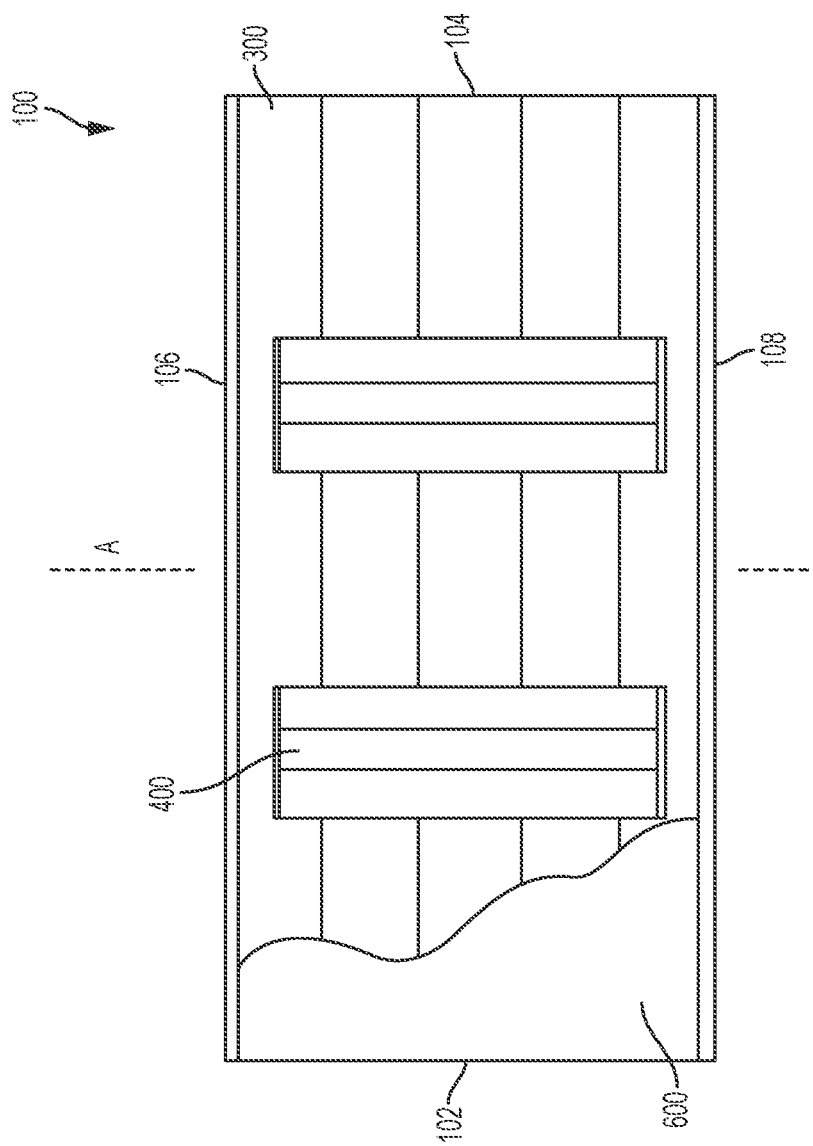
FIG. 4 shows a bottom plan view of the composite floor structure of FIG. 1, with a portion of the underlayment removed to show the plurality of transverse beams.

The illustrative composite floor structure 100 is generally rectangular in shape, although this shape may vary. As shown in FIG. 2, the composite floor structure 100 has a width W between a right side 102 and a left side 104. As shown in FIG. 3, the composite floor structure 100 has a length L between a front end 106 and a rear end 108. The length L and the width W may vary depending on the needs of the particular application. As shown in FIG. 4, the composite floor structure 100 also has a longitudinal axis A that extends through the front end 106 and the rear end 108. In various embodiments, floor structure 100 may have curvature along the longitudinal axis A.

Figure 5:
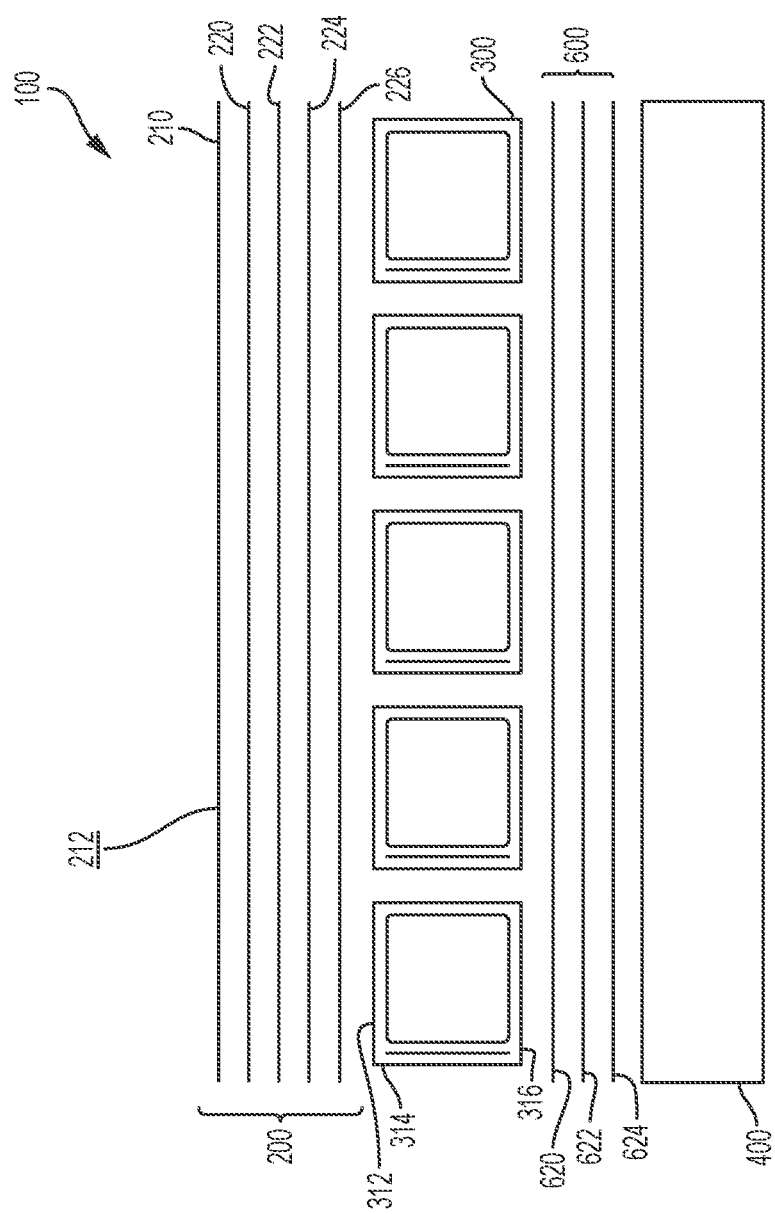
FIG. 5 shows an exploded side view of the platform of FIG. 1.

The illustrative composite floor structure 100 includes a deck or platform 200, a plurality of transverse beams 300 extending from the right side 102 to the left side 104 beneath the platform 200, and a plurality of longitudinal beams 400 extending from the front end 106 to the rear end 108 beneath the transverse beams 300. As shown in FIG. 4, the transverse beams 300 extend perpendicular to the longitudinal axis A, and the longitudinal beams 400 extend parallel to the longitudinal axis A. As shown in FIG. 5, the composite floor structure 100 may also include an underlayment 600 located below transverse beams 300 and above longitudinal beams 400 and parallel to platform 200.

In the illustrated embodiment of FIGS. 1-5, the composite floor structure 100 includes five transverse beams 300 and two longitudinal beams 400, but the number of beams 300, 400 may vary depending on the needs of the particular application. Also, the size of each beam 300, 400 and the spacing between adjacent beams 300, 400, if any, may vary depending on the needs of the particular application. For example, a relatively large number of closely-spaced beams 300, 400 may be used for high-weight/high-strength applications, whereas a relatively small number of spaced-apart beams 300, 400 may be used for low-weight/low-strength applications.

2. Composite Materials with Reinforcing Layers and/or Structural Preforms

The composite floor structure 100 may be constructed, at least in part, of composite materials. For example, the platform 200, the transverse beams 300, the longitudinal beams 400, and/or the underlayment 600 of the composite floor structure 100 may be constructed of composite materials. As such, the platform 200, the transverse beams 300, the longitudinal beams 400, and/or the underlayment 600 of the composite floor structure 100 may be referred to herein as composite structures. These composite structures may lack internal metal components. Also, each composite structure may be a single, unitary component, which may be formed from a plurality of layers permanently coupled together. Exemplary composite materials for use in the composite floor structure 100 include fiber-reinforced plastics (FRP), for example carbon-fiber-reinforced plastics (CRP).

Each composite structure may contain one or more reinforcing layers that contains reinforcing fibers and is capable of being impregnated and/or coated with a resin, as discussed in Section 7 below. Suitable fibers include carbon fibers, glass fibers, cellulose, or polymers, for example. The fibers may be present in fabric form, which may be mat, woven, non-woven, or chopped, for example. Exemplary reinforcing layers include chopped fiber fabrics, such as chopped strand mats (CSM), and continuous fiber fabrics, such as 0°/90° fiberglass fabrics, +45°/−45° fiberglass fabrics, +60°/−60° fiberglass fabrics, 0° warp unidirectional fiberglass fabrics, and other stitched fiber fabrics, for example. Such fabrics are commercially available from Vectorply Corporation of Phenix City, Ala.

According to an exemplary embodiment of the present disclosure, a plurality of different reinforcing materials may be stacked together and used in combination. For example, a chopped fiber fabric (e.g., CSM) may be positioned adjacent to a continuous fiber fabric. In this stacked arrangement, the chopped fibers may help support and maintain the adjacent continuous fibers in place, especially around corners or other transitions. Also, the chopped fibers may serve as a web to resist column-type loads in compression, while the adjacent continuous fibers may resist flange-type loads in compression. Adjacent reinforcing layers may be stitched or otherwise coupled together to simplify manufacturing, to ensure proper placement, and to prevent shifting and/or bunching.

Also, certain composite structures may contain a structural support or preform. The preform may have a structural core that has been covered with an outer fabric layer or skin. The core may be extruded, pultruded, or otherwise formed into a desired shape and cut to a desired length. In an exemplary embodiment, the core is a polyurethane foam material or another foam material, and the outer skin is a spun bond polyester material. Exemplary preforms include PRISMA® preforms provided by Compsys, Inc. of Melbourne, Fla. Advantageously, in addition to its structural effect, the foam core may have an insulating effect in certain applications, including refrigerated trucking applications. Both the core and the outer skin may be selected to accommodate the needs of the particular application. For example, in areas of the preform requiring more strength and/or insulation, a low-density foam may be replaced with a high-density foam or a hard plastic block.

3. Platform

Referring next to FIG. 5, the platform 200 may be constructed from a plurality of layers permanently coupled or laminated together. From top to bottom in FIG. 5, the illustrative platform 200 includes a top layer 210 and four reinforcing layers 220, 222, 224, 226, although the number, types, and locations of these layers may vary depending on the needs of the particular application.

The top layer 210 of the platform 200 defines a flat upper surface 212 for supporting cargo or other objects. According to an exemplary embodiment of the present disclosure, the top layer 210 is a 1.5 ounce/yard$^2$ chopped fiber fabric (CSM) polymer. In other embodiments, the top layer 210 is a resin, gelcoat, metal (e.g., aluminum, stainless steel), polymer, wood, or pultrusion layer. The top layer 210 may be integrally molded with or otherwise applied to the reinforcing layers 220, 222, 224, 226, such as using structural adhesive, mechanical fasteners (e.g., bolts, rivets), or a spray coating process.

In various embodiments, the top layer 210 is a metal (e.g., aluminum, stainless steel) layer or includes a metal upper surface 212. The upper surface 212 of the metal may be completely flat or textured (e.g., dimpled or ridged) to provide a slip-resistant surface. The top layer 210 may also define channels (i.e., ducts), and such channels may extend through the interior of top layer 210 or across a surface (e.g., upper surface 212) of top layer 210. The top layer 210 may be extruded or otherwise formed into a desired width and cut to a desired length. An exemplary method for attaching top layer 210 during the molding process using one or more co-cure adhesives is disclosed in U.S. patent application Ser. No. 15/439,789, titled "Composites Formed from Co-Cure Adhesive," the disclosure of which is hereby expressly incorporated by reference herein in its entirety.

To accommodate different loads on the platform 200, each reinforcing layer 220, 222, 224, 226 may be unique to provide a combination of different fiber types, sizes, and/or orientations across the platform 200. In an exemplary embodiment, reinforcing layer 220 is a 0° unidirectional fiberglass fabric with the 0° direction of the fabric being oriented in the longitudinal direction of the composite floor structure 100 (i.e., parallel to the longitudinal axis A of FIG. 4) for added strength in the longitudinal direction, specifically E-LM 1810, reinforcing layer 222 is a 0°/90° fiberglass fabric, specifically E-LTM 3610, reinforcing layer 224 is a random-orientation chopped fiber fabric, specifically 3.0 ounce/yard$^2$ CSM, and reinforcing layer 226 is a 0°/90° fiberglass fabric, specifically E-LTM 2408. Additional disclosure regarding the reinforcing layers 220, 222, 224, 226 is set forth in Section 2 above.

4. Transverse Beams

Referring next to FIGS. 5-13, each transverse beam 300 may be constructed from a plurality of layers permanently coupled or laminated together such that each transverse beam 300 has an upper wall 312, side walls 314, and a lower wall 316. As shown in FIGS. 1-5, the transverse beams 300 may be placed side-by-side in direct contact with one another, such that the left side wall 314 of one transverse beam 300 directly contacts the right side wall 314 of the immediately adjacent transverse beam 300. This arrangement may provide stiffness and resistance to bending and deflection in the transverse direction. To facilitate this side-by-side contact without forming spaces or gaps therebetween, the side walls 314 may be parallel to each other. Thus, an exemplary transverse beam 300 may have a rectangular shape, a square shape, or another suitable parallelogram shape across its length. In this side-by-side arrangement of FIGS. 1-5, the upper walls 312 of transverse beams 300 may cooperate to provide a substantially smooth and continuous surface for platform 200, and the lower walls 316 of transverse beams 300 may cooperate to provide a substantially smooth and continuous surface for longitudinal beams 400 and/or underlayment 600.

a. First Embodiment

Figure 6:
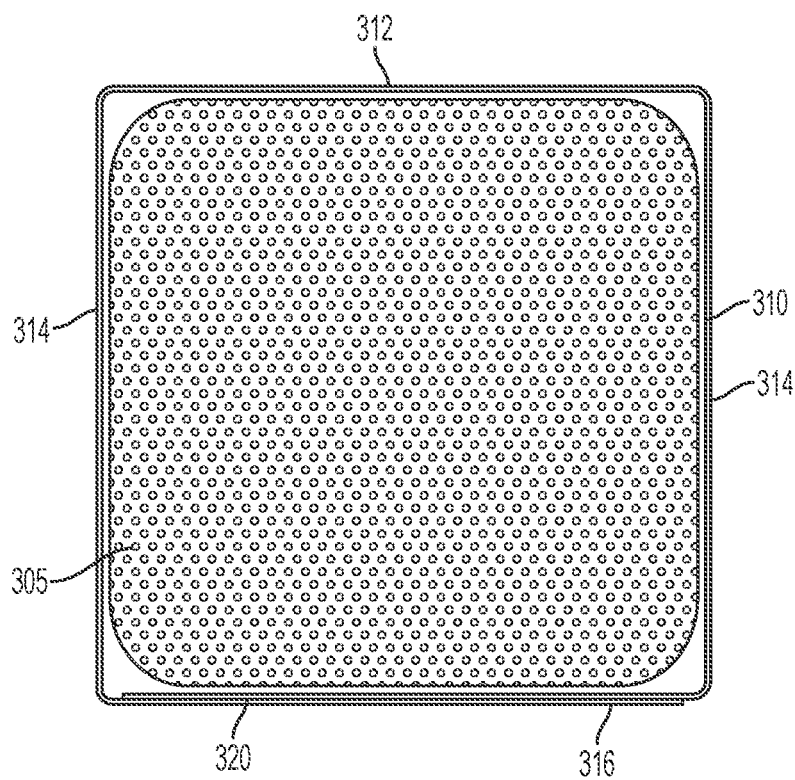
FIG. 6 shows an end view of a first embodiment of a transverse beam of the present disclosure.
Figure 7:
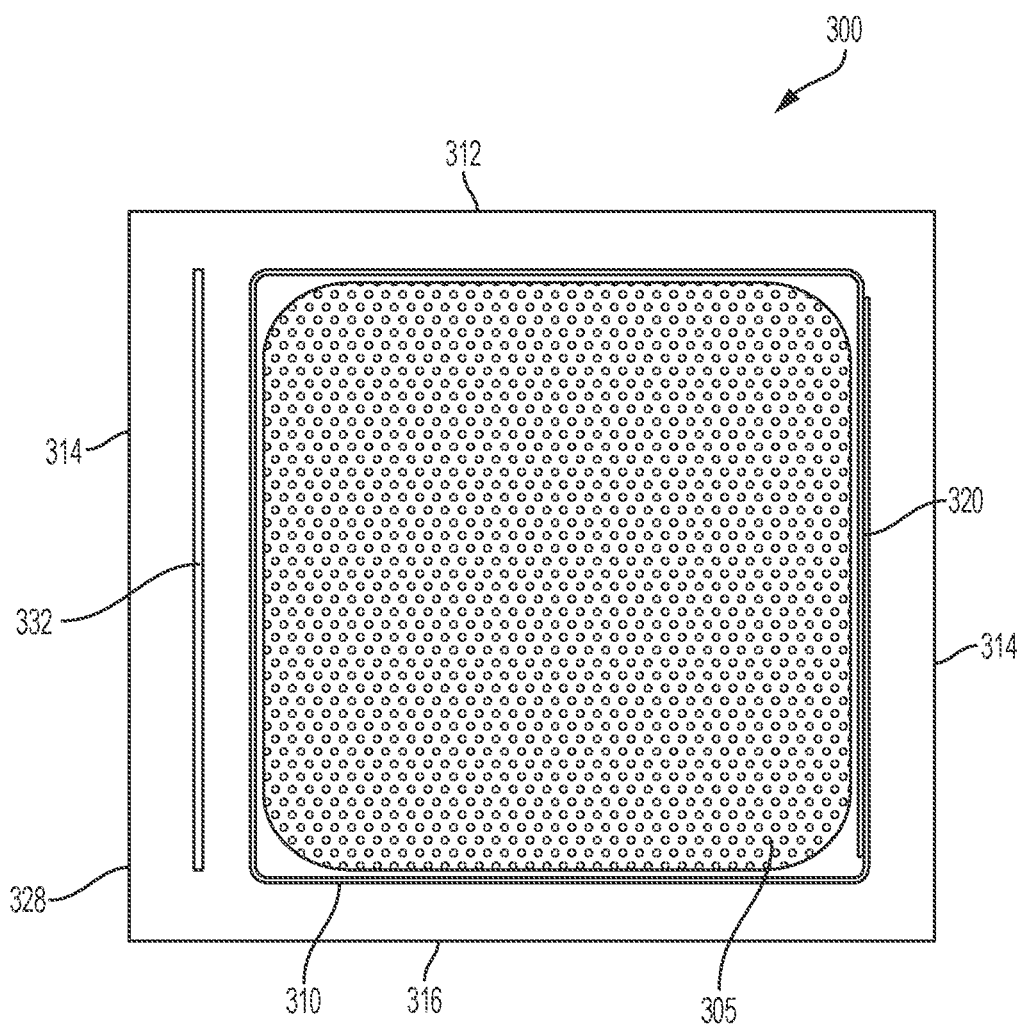
FIG. 7 shows an end view the transverse beam of FIG. 7 with additional reinforcing material.

With reference to FIGS. 6 and 7, a first illustrative transverse beam 300 of the present disclosure includes a primary reinforcing layer 310 with two tabs 320 wrapped around a preform core 305. Optionally, transverse beam 300 may include one or more additional reinforcing layers or sheets 328, 332, as shown in FIG. 7, although the number, types, and locations of reinforcing layers may vary depending on the needs of the particular application. Each reinforcing layer 310, 328, 332 may be unique to provide a combination of different fiber types, sizes, and/or orientations across the transverse beam 300. Additional disclosure regarding the reinforcing layers 310, 328, 332 is set forth in Section 2 above.

The primary reinforcing layer 310 is generally formed around at least three sides of the preform core 305 with the two tabs 320 folded onto each other in an overlapping manner and covering at least one side of the preform core 305 such that a circumferential skin around the preform core 305 is formed by the primary reinforcing layer 310. The tabs 320 may be molded in a double-thickness laminate to form one side of the transverse beam 300. In the illustrated embodiment of FIG. 6, the overlapping tabs 320 help form the lower wall 316 of transverse beam 300. In the illustrated embodiment of FIG. 7, the overlapping tabs 320 help form the right side wall 314 of transverse beam 300. The tabs 320 become attached to the preform core 305 and each other when impregnated with a resin and pressed together to consolidate and make contact with the preform core 305, as discussed further in Section 7 below.

The additional reinforcing layer 328 shown in FIG. 7 may include continuous fiber reinforcement strands or fiber fabric which is wound entirely or partially around the preform core 305 and the other reinforcing layers 310 and/or 332. The other additional reinforcing layer 332 shown in FIG. 7 may be oriented vertically parallel to at least one of the side walls 314 to form a load-supporting web of the floor structure 100 (see also FIG. 5).

In various embodiments, and as shown in FIGS. 1-4, the transverse beams 300 are placed side-by-side in direct contact with one another. In the illustrated embodiment of FIG. 6, a single-layer left side wall 314 would adjoin a single-layer right side wall 314 of the neighboring transverse beam 300. In the illustrated embodiment of FIG. 7, the left side wall 314 with the additional reinforcing layer 332 would adjoin a right side wall 314 of the neighboring transverse beam 300 with overlapping tabs 320 for additional strength and stiffness against compression loads and shear loads produced by a fork truck tire rolling on top of the floor structure 100.

b. Second Embodiment

Figure 8A:
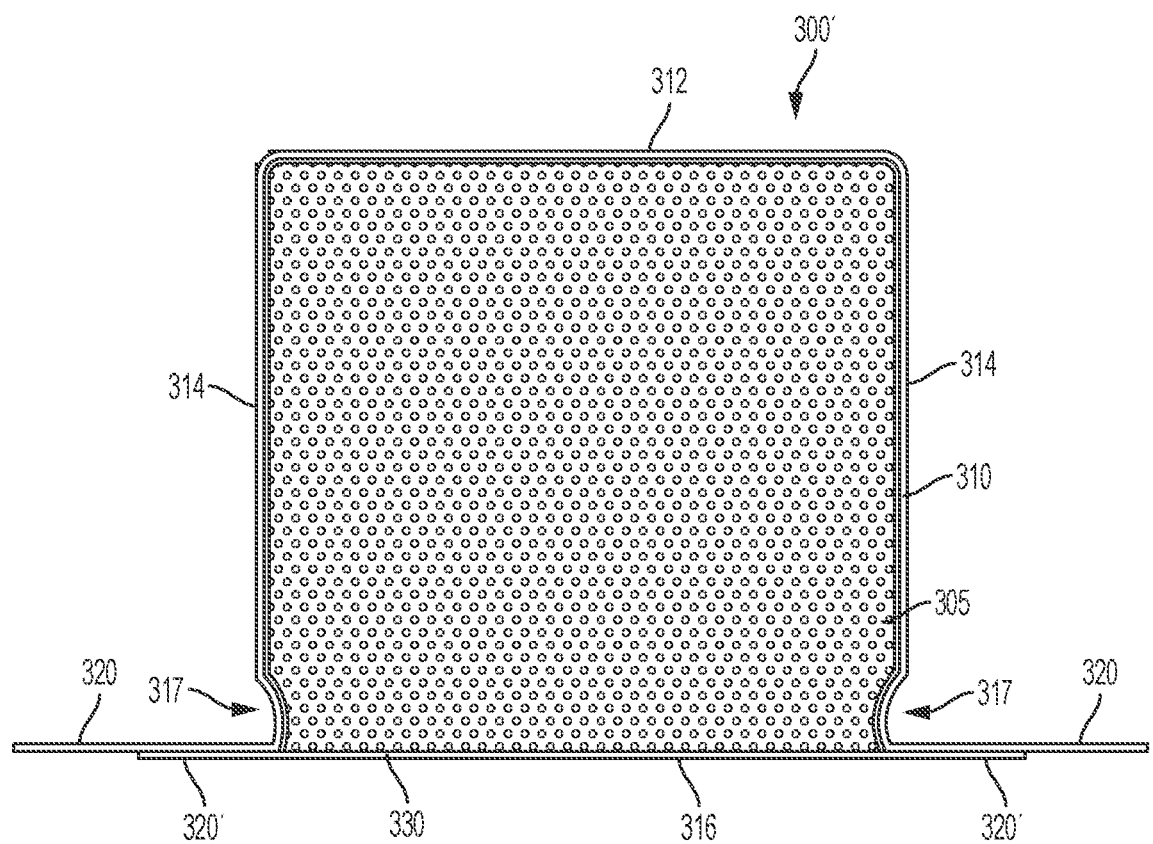
FIG. 8A shows an end view of a second embodiment of a transverse beam of the present disclosure with tabs attached.
Figure 8B:
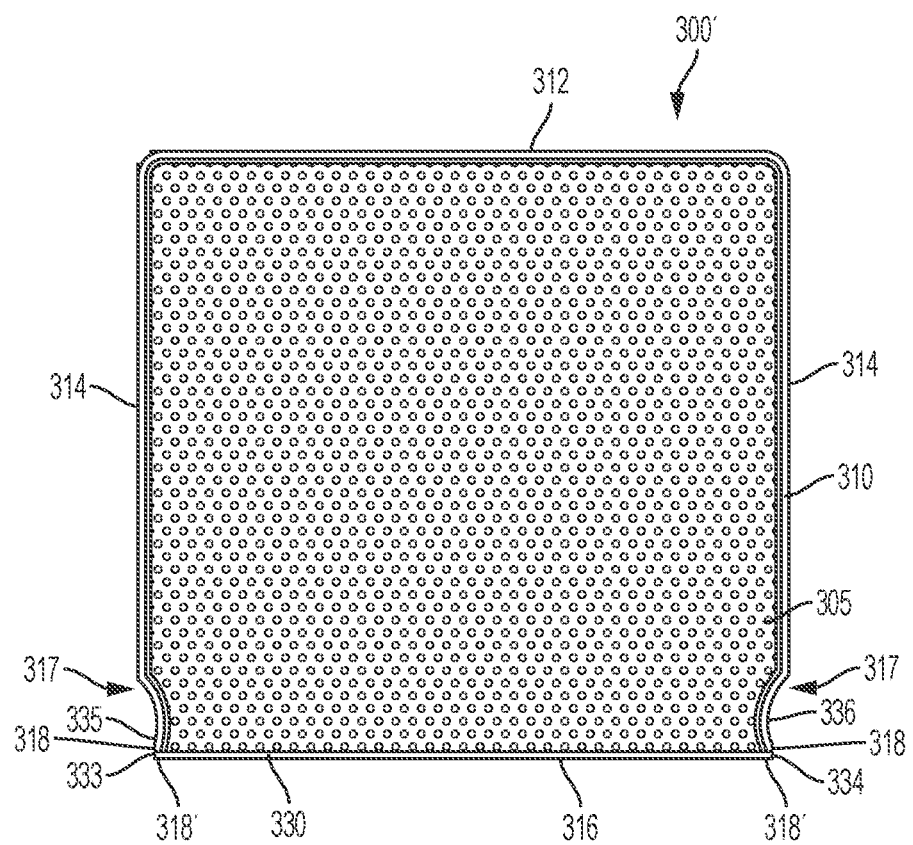
FIG. 8B shows an end view of the second embodiment of FIG. 8A with tabs removed providing exposed cut edges.
Figure 8C:
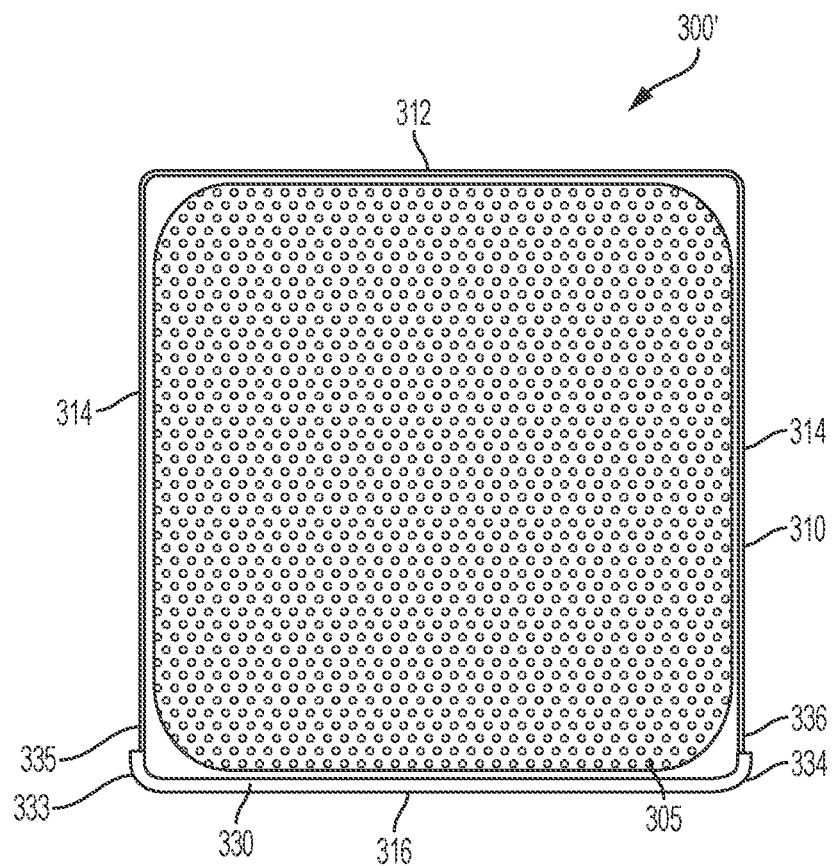
FIG. 8C shows an end view of the second embodiment of FIG. 8A with coupled edges.
Figure 9:
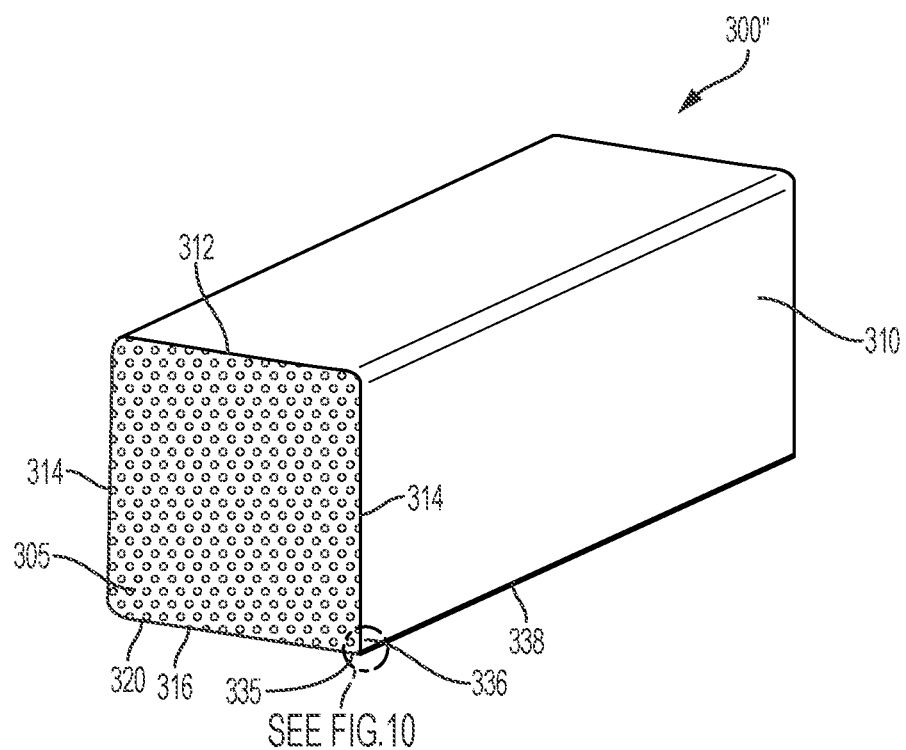
FIG. 9 shows an end view of a third embodiment of a transverse beam of the present disclosure.

Referring now to FIGS. 8A-8C, a second illustrative transverse beam 300' of the present disclosure may include a primary reinforcing layer 310 similar to the transverse beam 300 of FIGS. 6 and 7, but with the tabs 320 of the primary reinforcing layer 310 both removed after the primary reinforcing layer 310 is coupled to at least three sides of the preform core 305. For example, both tabs 320 may be removed by conveying transverse beam 300 across two parallel blades (not shown) resulting in reinforcing layer 310 having cut or trimmed edges 318. In place of the tabs 320, the transverse beam 300' may further include an additional reinforcing layer 330, for instance a strip of a fiber stitched cloth, covering the remaining exposed side(s) of the preform core 305. In various embodiments, additional reinforcing layer 330 may be placed against the exposed side of preform core 305 before tabs 320 are removed from reinforcing layer 310 such that tabs 320 of reinforcing layer 310 and tabs 320' of additional reinforcing layer 330 may be removed together resulting in cut or trimmed edges 318 on reinforcing layer 310 and cut or trimmed edges 318' on additional reinforcing layer 330 (see FIG. 8B). In the illustrated embodiment of FIGS. 8A-8C, the additional reinforcing layer 330 helps form the lower wall 316 of transverse beam 300. The additional reinforcing layer 330 is positioned such that a first edge 333 of the additional reinforcing layer 330 is adjacent to a first edge 335 of the primary reinforcing layer 310 and a second edge 334 of the additional reinforcing layer 330 is adjacent to a second edge 336 of the primary reinforcing layer 310. In various embodiments, the primary reinforcing layer 310 and the additional reinforcing layer 330 are not physically connected to each other, but rather are incorporated into, adhered to, or otherwise coupled to the preform core 305 to keep them in place (see FIGS. 8A and 8B). In this embodiment, the reinforcing layer 310 and the additional reinforcing layer 330 would be indirectly coupled together via the preform core 305. In other various embodiments, the first edge 333 of the additional reinforcing layer 330 is directly coupled to the first edge 335 of the primary reinforcing layer 310 and the second edge 334 of the additional reinforcing layer 330 is directly coupled to the second edge 336 of the primary reinforcing layer 310 (see FIG. 8C). The edges may be coupled via various means, for example, a structural adhesive, a thread, staples, etc. Optionally, transverse beam 300' may include one or more additional reinforcing layers or sheets, although the number, types, and locations of reinforcing layers may vary depending on the needs of the particular application. In various embodiments, preform core 305 may include indentations 317 as a result of an undercut in the die during the manufacturing process.

c. Third Embodiment

Figure 10:
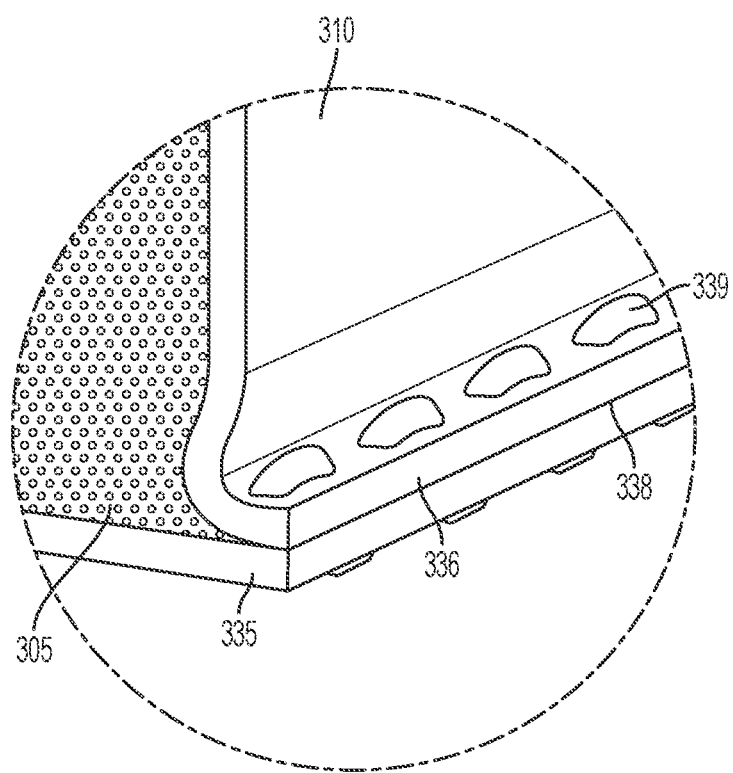
FIG. 10 shows a detailed view of the area circled in FIG. 9.

As shown in FIGS. 9-13, a third illustrative embodiment of transverse beam 300" may include a primary reinforcing layer 310 similar to the transverse beam 300 of FIGS. 6 and 7 but with one of the tabs 320 of the primary reinforcing layer 310 being removed. For example, the tab 320 may be removed by conveying transverse beam 300 across a blade (not shown). The primary reinforcing layer 310 is generally wrapped around at least three sides of the preform core 305 with the remaining tab 320 folded over to cover at least one side of the preform core 305 such that a circumferential skin around the preform core 305 is formed by the primary reinforcing layer 310. The two free edges 335, 336 of the primary reinforcing layer 310 are configured to be sewn together along one beam edge 338 with a strong continuous fiber thread 339 or other coupling means (i.e., staples, a structural adhesive, etc.), as shown in FIG. 10. However, in various embodiments, free edges 335, 336 may simply be held adjacent one another due to the incorporation or adhesion of primary reinforcing layer 310 to preform core 305 and not physically coupled together. Optionally, transverse beam 300" may include one or more additional reinforcing layers or sheets, although the number, types, and locations of reinforcing layers may vary depending on the needs of the particular application.

Figure 13:
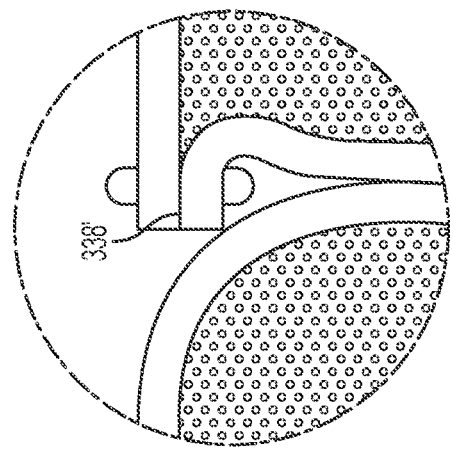
FIG. 13 shows a detailed view of the area circled in FIG. 11.
Figure 12:
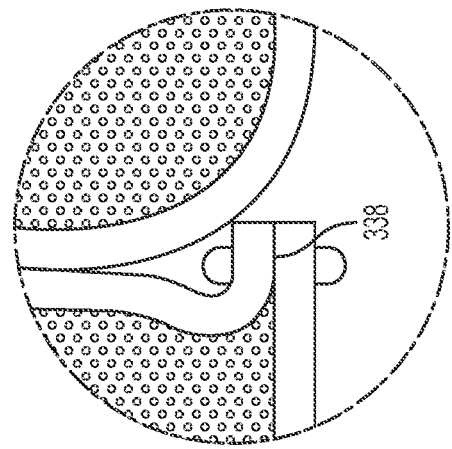
FIG. 12 shows a detailed view of the area circled in FIG. 11.

Referring now to FIGS. 11-13, the transverse beams 300" may be positioned side-by-side in direct contact with one another such that one of the sewn edge 338 of a first transverse beam 300" or the sewn edge 338' of a second transverse beam is positioned at the top of the abutment between the two transverse beams (detail shown in FIG. 13), and the other sewn edge 338 or 338' is positioned at the bottom of an abutment of the two transverse beams 300" (detail shown in FIG. 12) in order to maximize the abutment between multiple transverse beams 300". In the illustrated embodiment of FIGS. 11-13, right side wall 314' of the left transverse beam 300" abuts left side wall 314" of the right transverse beam 300" such that sewn edge 338 of the left transverse beam 300" is positioned substantially flush with lower walls 316' of the left and right transverse beams 300", and sewn edge 338' of the right transverse beam 300" is positioned substantially flush with upper walls 312' of the left and right transverse beams 300". To achieve this side-by-side arrangement with offset sewn edges 338, 338', the transverse beams 300" may have an identical construction but may be rotated 180 degrees relative to each another.

5. Longitudinal Beams

Figure 14:
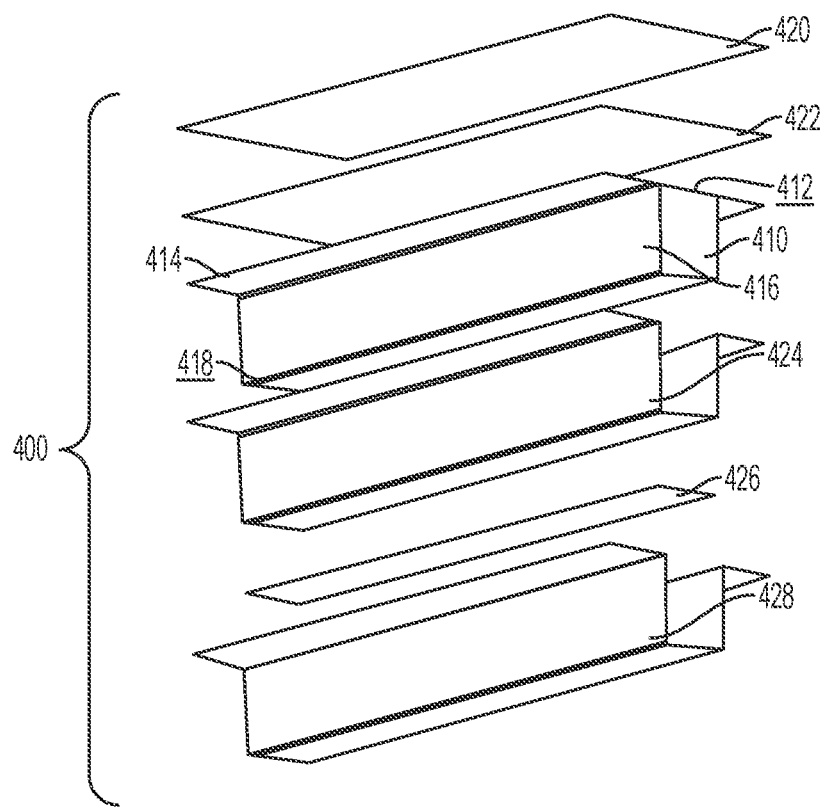
FIG. 14 shows an exploded perspective view of the longitudinal beam of FIG. 1.

Referring next to FIG. 14, each longitudinal beam 400 may be constructed from a plurality of layers permanently coupled or laminated together. The longitudinal beams 400 may provide stiffness and resistance to bending and deflection in the longitudinal direction and may help couple adjacent transverse beams 300 together. Also, the longitudinal beams 400 may serve as a connection point for another structure, such as a vehicle chassis, a wheel assembly, or a landing gear in trucking applications. From top to bottom in FIG. 14, the illustrative longitudinal beam 400 includes two upper reinforcing layers 420, 422, a preform 410, and three lower reinforcing layers 424, 426, 428, although the number, types, and locations of these layers may vary depending on the needs of the particular application.

The illustrative preform 410 of FIG. 14 has an upper surface 412 with two flanges 414 configured to support the transverse beams 300 located above longitudinal beams 400, side walls 416, and a lower surface 418. From the upper surface 412 to the lower surface 418, the side walls 416 have a slight inward taper or draft such that the preform 410 narrows in width and is generally trapezoidal in cross-section. This trapezoidal shape may facilitate mold extraction, as discussed in Section 7 below. Additional disclosure regarding the preform 410 is set forth in Section 2 above.

As shown in FIG. 14, the upper reinforcing layers 420, 422 are sized and shaped to extend across the upper surface 412 and flanges 414 of the preform 410. Two of the lower reinforcing layers 424, 428 are sized and shaped to wrap around the side walls 416 and the lower surface 418 of the preform 410, whereas the reinforcing layer 426 is a thin strip that is sized and shaped for selective receipt beneath the lower surface 418 of the preform 410. To accommodate different loads on the longitudinal beams 400, each reinforcing layer 420, 422, 424, 426, 428 may be unique to provide a combination of different fiber types, sizes, and/or orientations across the longitudinal beam 400. Additional disclosure regarding the reinforcing layers 420, 422, 424, 426, 428 is set forth in Section 2 above.

In other embodiments, the longitudinal beam 400 may be a non-composite structure, such as a metal (e.g., aluminum) beam or wood beam, for example. In these embodiments, the longitudinal beam 400 may be coupled to the rest of the composite floor structure 100 using structural adhesive and/or mechanical fasteners (e.g., bolts, rivets), for example.

6. Underlayment

Referring back to FIG. 5, underlayment 600 is located below transverse beams 300 and above longitudinal beams 400 in a sandwiched arrangement. Underlayment 600 is arranged parallel to platform 200. Underlayment 600 may be constructed from a plurality of reinforcing layers permanently coupled or laminated together. From top to bottom in FIG. 5, the illustrative underlayment 600 includes three reinforcing layers 620, 622, 624, although the number, types, and locations of these layers may vary depending on the needs of the particular application. When the illustrative composite floor structure 100 is assembled, the top reinforcing layer 620 is coupled to transverse beams 300, and the bottom reinforcing layers 622, 624 are coupled to longitudinal beams 400. It is also within the scope of the present disclosure for underlayment 600 to include a single reinforcing layer (e.g., reinforcing layer 620). In this embodiment, the top surface of the reinforcing layer 620 would be coupled to transverse beams 300, and the bottom surface of reinforcing layer 620 would be coupled to longitudinal beams 400.

Underlayment 600 may experience high tensile stresses, such as when a fork truck drives over the composite floor structure 100. Underlayment 600 may be designed to accommodate the type of floor structure 100, its load rating, the allowed floor maximum deflection requirement, and other requirements. In embodiments where underlayment 600 contains a plurality of reinforcing layer 620, 622, 624, each reinforcing layer 620, 622, 624 may be unique to provide a combination of different fiber types, sizes, and/or orientations across the underlayment 600.

In one example, underlayment 600 includes two reinforcing layers 620 and 622, where reinforcing layer 620 is constructed of a random-orientation chopped fiber fabric, specifically CSM, and reinforcing layer 622 is constructed of a 0/90 fiberglass fabric, specifically E-LTM 3610. The CSM of reinforcing layer 620 may have a weight as low as about 1.5 ounce/yard$^2$ and as high as about 6.0 ounce/yard$^2$. The 0/90 fiberglass fabric may have the 90° direction of the fabric being oriented in the lateral direction of the composite floor structure 100 (i.e., perpendicular to the longitudinal axis A of FIG. 4) for added strength in the lateral direction, specifically to help with bending in the transverse direction, and the 0° direction of the fabric being oriented in the longitudinal direction of the composite floor structure 100 (i.e., parallel with the longitudinal axis A of FIG. 4) for added strength in the longitudinal direction, specifically to help tie the caps of the transverse beams together to prevent them from trying to separate when longitudinal bending takes place.

In another example, underlayment 600 includes a single reinforcing layer 620 constructed of a random-orientation chopped fiber fabric, specifically CSM. The CSM of reinforcing layer 620 may have a weight as low as about 1.5 ounce/yard$^2$ and as high as about 6.0 ounce/yard$^2$.

In yet another example, underlayment 600 includes a single reinforcing layer 620 constructed of a continuous fiber fabric, specifically a 0/90 fiberglass fabric. The 90° direction of the fabric may be oriented in the lateral direction of the composite floor structure 100 (i.e., perpendicular to the longitudinal axis A of FIG. 4) to help with bending in the transverse direction, and the 0° direction of the fabric being oriented in the longitudinal direction of the composite floor structure 100 (i.e., parallel with the longitudinal axis A of FIG. 4) to help tie the caps of the transverse beams together to prevent them from trying to separate when longitudinal bending takes place.

Additional disclosure regarding the one or more reinforcing layers 620, 622, 624 of underlayment 600 is set forth in Section 2 above.

7. Molding Process

The composite floor structure 100 may be formed by a molding process. An exemplary molding process involves placing the preforms (e.g., preforms 305, 410, 510) and the reinforcing layers (e.g., reinforcing layers 220, 222, 224, 226, 310, 328, 330, 332, 420, 422, 424, 426, 428, 620, 622, 624) together in a mold, wetting the materials with at least one resin and a catalyst to impregnate and/or coat the materials, and curing the materials to form a single, integral, laminated composite floor structure 100. In certain embodiments, the top layer 210 of the platform 200 may also be placed inside the mold and integrally molded with the composite floor structure 100, as discussed in Section 3 above. After curing, the preforms 305, 410, 510 may be extracted from the mold, which may be an open mold or a closed mold.

The resin used to construct the composite floor structure 100 may be a typical resin, a co-cure resin containing a plurality of individual co-curing resins which may be selectively distributed throughout the composite floor structure 100 during the molding process, or a combination thereof. Such co-cure resins may comprise one or more elastomer components, such as urethane, co-cured with one or more resin components, such as a vinyl ester, epoxy, or unsaturated polyester components. Exemplary co-cure resins are disclosed in U.S. Pat. No. 9,371,468 and U.S. Publication No. 2016/0263873, the disclosures of which are hereby incorporated by reference in their entirety. As used herein, "co-cured" refers to the reactions involved in curing the elastomer components take place essentially concurrently with the reactions involved in curing the one or more resin components. In certain embodiments, areas of the composite floor structure 100 that will be susceptible to high stress may receive a resin with a relatively higher polyurethane content for strength, whereas other areas of the composite floor structure 100 that provide bulk and section modulus may receive a lower cost rigid, polyester-based resin, such as an isophthalic polyester resin.

When composite floor structure 100 is part of a cargo vehicle, for example, a similar method may be performed using similar materials to construct other elements of the cargo vehicle, such as the nose, sidewalls, and/or roof.

Additional information regarding the construction of the composite floor structure 100 is disclosed in the following patents and published patent applications, each of which is incorporated by reference in its entirety herein: U.S. Pat. Nos. 5,429,066, 5,800,749, 5,664,518, 5,897,818, 6,013,213, 6,004,492, 5,908,591, 6,497,190, 6,911,252, 5,830,308, 6,755,998, 6,496,190, 6,911,252, 6,723,273, 6,869,561, 8,474,871, 6,206,669, 6,543,469, and 9,371,468, and U.S. Patent Application Publication No. 2014/0262011.

In another embodiment, individual pieces of the composite floor structure 100 may be molded and then coupled together using structural adhesive and/or mechanical fasteners (e.g., bolts, rivets), for example.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A composite floor structure for use in a cargo vehicle having a front end, a rear end, and a longitudinal axis extending between the front and rear ends, the composite floor structure comprising:
   a plurality of transverse beams, each transverse beam being constructed of a composite material and having an upper wall, a first side wall, a second side wall, and a lower wall, the plurality of transverse beams arranged perpendicular to the longitudinal axis and in direct contact with one another such that the first side wall of one transverse beam directly contacts the second side wall of an immediately adjacent transverse beam;
   wherein the lower walls of the plurality of transverse beams cooperate to provide a substantially smooth and continuous surface that supports a plurality of longitudinal beams that extend parallel to the longitudinal axis and perpendicular to the plurality of transverse beams;
   wherein the composite floor structure further comprises an underlayment positioned between the plurality of transverse beams and the plurality of longitudinal beams.

2. The composite floor structure of claim 1, wherein the upper walls of the plurality of transverse beams cooperate to provide a substantially smooth and continuous surface that supports a platform having a flat upper surface configured to support cargo in the cargo vehicle.

3. The composite floor structure of claim 1, wherein each transverse beam is constructed of a preform core with at least one reinforcing layer wrapped around the preform core.

4. The transverse beam of claim 1, wherein the first and second side walls of each transverse beam are parallel to each other.

5. A transverse beam comprising:
   a preform core having a plurality of side surfaces arranged in a parallelogram; and
   a primary reinforcing layer formed around each of the side surfaces of the preform core, the primary reinforcing layer including two tabs folded onto one another and sized to cover at least one of the plurality of side surfaces of the preform core.

6. The transverse beam of claim 5 further comprising an additional reinforcing layer wound at least partially around both the preform core and the primary reinforcing layer.

7. The transverse beam of claim 5 further comprising a first additional reinforcing layer oriented vertically parallel to at least one side surface of the preform core.

8. The transverse beam of claim 7 further comprising a second additional reinforcing layer wound at least partially around the preform core, the primary reinforcing layer, and the first additional reinforcing layer.

9. The transverse beam of claim 5, wherein the preform core is constructed of foam.

10. The transverse beam of claim 5, wherein the transverse beam includes an upper surface and a lower surface, the transverse beam being of substantially constant width from the upper surface to the lower surface.

11. The transverse beam of claim 5, wherein the two tabs of the primary reinforcing layer are impregnated with a resin and are in contact with the preform core.

12. The transverse beam of claim 5, wherein the preform core has a shape of one of a square or a rectangle across its length.

13. The transverse beam of claim 7, wherein the two tabs of the primary reinforcing layer and the first additional reinforcing layer cover opposing side surfaces of the preform core.

14. A transverse beam comprising:
   a preform core having a plurality of side surfaces;
   a primary reinforcing layer formed around at least three side surfaces of the preform core; and
   an additional reinforcing layer sized to cover at least one side of the preform core separate from the at least three side surfaces covered by the primary reinforcing layer, the primary reinforcing layer and the additional reinforcing layer each having a first edge and a second edge, the first edge of the primary reinforcing layer being adjacent to the first edge of the additional reinforcing layer and the second edge of the primary reinforcing layer being adjacent to the second edge of the additional reinforcing layer.

15. The transverse beam of claim 14, wherein the first edge of the primary reinforcing layer and the first edge of the additional reinforcing layer and the second edge of the primary reinforcing layer and the second edge of the additional reinforcing layer are both directly coupled together.

16. The transverse beam of claim 15, wherein the first edges and second edges are coupled together using at least one of a structural adhesive, a thread, and at least one staple.

17. The transverse beam of claim 14, wherein the primary reinforcing layer and the additional reinforcing layer are indirectly coupled together through the preform core.

18. The transverse beam of claim 14, wherein the additional reinforcing layer is a fiber stitched cloth.

19. The transverse beam of claim 14, wherein the first edge of the primary reinforcing layer and the first edge of the additional reinforcing layer are cut edges adjacent one another, and the second edge of the primary reinforcing layer and the second edge of the additional reinforcing layer are cut edges adjacent one another.

20. A transverse beam comprising:
   a preform core having a plurality of side surfaces; and
   a primary reinforcing layer formed around each of the side surfaces of the preform, wherein the primary reinforcing layer has a first edge and a second edge, the first and second edges being coupled together.

21. The transverse beam of claim 20, wherein the first and second edges are coupled together using at least one of a thread, a structural adhesive, and the at least one staple.

22. The transverse beam of claim 21, wherein the first and second edges are sewn together using the thread.

23. The transverse beam of claim 20, wherein the first edge and the second edge are coupled together along an edge of the preform core.

* * * * *